(12) United States Patent
Yasukawa et al.

(10) Patent No.: US 8,785,777 B2
(45) Date of Patent: Jul. 22, 2014

(54) ACTUATOR CONTROL DEVICE, AND METHOD OF MANUFACTURING CIRCUIT DEVICE IN ACTUATOR CONTROL DEVICE

(75) Inventors: Daisuke Yasukawa, Isesaki (JP); Hirofumi Watanabe, Isesaki (JP); Kazuhiko Nakano, Isesaki (JP); Kenji Kikuchi, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 437 days.

(21) Appl. No.: 12/976,001

(22) Filed: Dec. 22, 2010

(65) Prior Publication Data

US 2011/0155414 A1 Jun. 30, 2011

(30) Foreign Application Priority Data

Dec. 25, 2009 (JP) .................................. 2009-293797

(51) Int. Cl.
*H02G 5/00* (2006.01)

(52) U.S. Cl.
USPC ....................................... 174/68.2; 174/72 B

(58) Field of Classification Search
USPC ........ 174/68.2, 71 B, 72 B, 72 C, 74 R, 75 R; 361/611; 439/130, 507, 510
See application file for complete search history.

(56) References Cited

U.S. PATENT DOCUMENTS 6,341,967 B1 * 1/2002 Nabeshima et al. .......... 439/130

FOREIGN PATENT DOCUMENTS

| JP | 10-304679 A | 11/1998 |
| JP | 2003-134725 A | 5/2003 |
| JP | 2003-319665 A | 11/2003 |

OTHER PUBLICATIONS

Machine translation of JP 2003-319665, Ishikawa et al. (Jul. 11, 2003).*
Japanese-language Office Action dated Apr. 30, 2013 with English translation (Five (5) pages).

* cited by examiner

*Primary Examiner* — Tremesha S Willis
(74) *Attorney, Agent, or Firm* — Crowell & Moring LLP

(57) ABSTRACT

An actuator control device includes a circuit device that is resin-molded by a plurality of metal molds including at least one movable metal mold to include a first bus bar and a second bus bar. The first bus bar and the second bus bar each include a flat plate-like portion that includes two main flat-face portions having large surface areas, and two sub flat-face portions that are adjacent to the main flat-face portions and have smaller surface areas than the surface areas of the main flat-face portions. One of the main flat-face portions of the first bus bar faces one of the main flat-face portions of the second bus bar. The facing direction differs from the mold release direction of the movable metal mold.

7 Claims, 14 Drawing Sheets

REGULAR MOLDING PORTION
(c1-c1 CROSS-SECTION)

ACTUATOR CONTROL DEVICE, AND METHOD OF MANUFACTURING CIRCUIT DEVICE IN ACTUATOR CONTROL DEVICE

BACKGROUND OF THE INVENTION

1. Field of the Invention

The present invention relates to an actuator control device that includes a circuit device designed to include a pair of bus bars, and a method of manufacturing the circuit device in the actuator control device.

2. Description of Related Art

In a circuit device disclosed in Japanese Laid-Open (Kokai) Patent Application Publication No. 2003-319665, a pair of bus bars are arranged, with main flat-face portions (planes perpendicular to the thickness direction) of flat plate-like portions facing each other and extending in parallel with each other.

In a case in which resin molding is performed with a plurality of metal molds so that bus bars are integrated with resin, if the main flat-face portions of the bus bars are placed to face each other in the mold release direction, the following problem occurs. That is, even if the one metal mold tries to hold the bus bars, the one bus bar placed in the one metal mold side causes interference between the one metal mold and the other bus bar. As a result, it becomes difficult to hold the other bus bar in the one metal mold.

Therefore, to secure the holding portion to hold the other bus bar in the one of the metal molds, it is necessary to change the shape of one of the bus bars. This adversely affects miniaturization of the control device, and increases the costs for the control device.

SUMMARY OF THE INVENTION

The present invention has been made in view of the above problems, and an object thereof is to provide a control device that can be advantageously made smaller in size and can prevent a cost increase in an actuator control device in which a circuit device formed by resin-molding bus bars having main flat-face portions positioned to face each other is used.

Therefore, the present invention provides an actuator control device that includes a circuit device that includes a first bus bar and a second bus bar, and is resin-molded by the plurality of metal molds including at least one movable metal mold. In this actuator control device, the first bus bar and the second bus bar each include a flat plate-like portion that includes two main flat-face portions with large surface areas, and two sub flat-face portions that are adjacent to the main flat-face portions and have smaller surface areas than the main flat-face portions. One of the main flat-face portions of the first bus bar and one of the main flat-face portions of the second bus bar are arranged to face each other, and the facing direction is different from the mold release direction of the movable metal mold.

The other objects and features of this invention will become understood from the following description with reference to the accompanying drawings.

DESCRIPTION OF THE PREFERRED EMBODIMENTS

The following is a description of a first embodiment of an electronic circuit device for vehicle brakes according to the present invention, with reference to the accompanying drawings.

Figure 1:
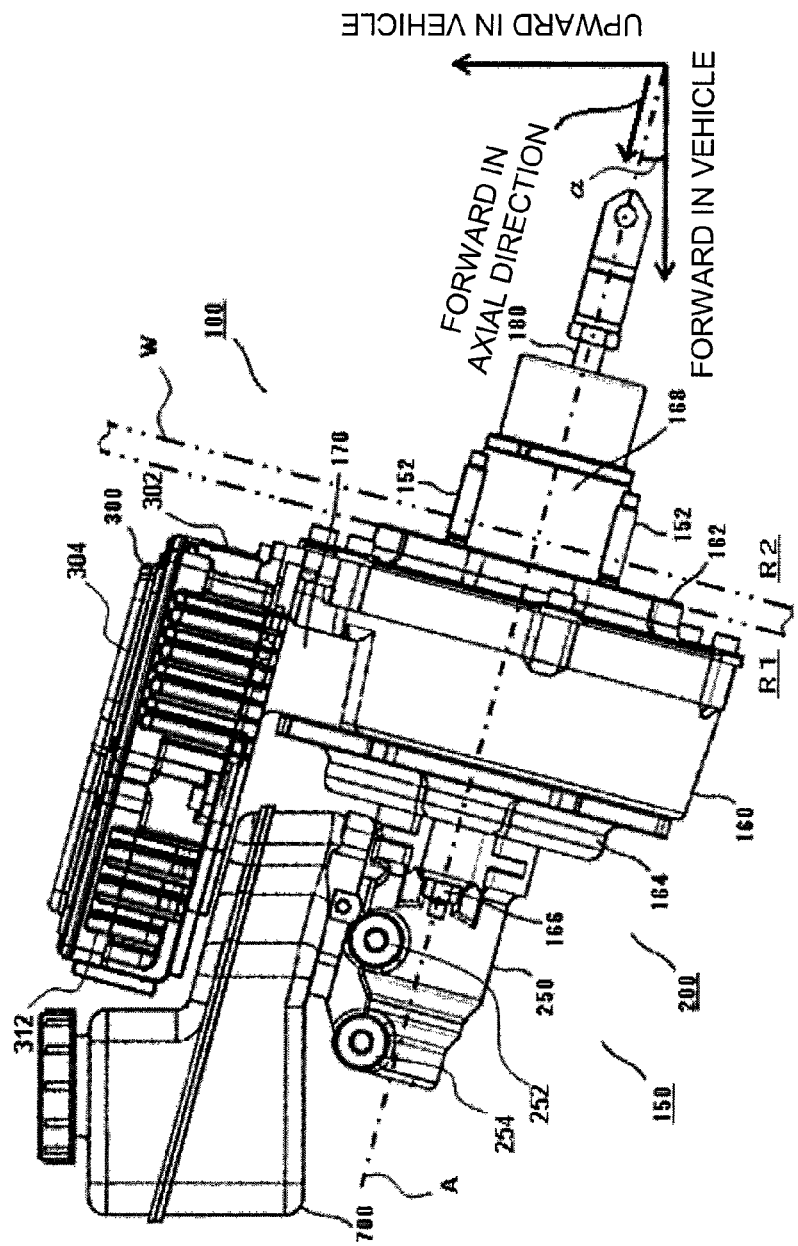
FIG. 1 is a side view of an electric brake booster device on which an electronic circuit device for vehicle brakes is mounted in a first embodiment of the present invention.

FIG. 1 is a side view of an electric brake booster device 100 on which the electronic circuit device for vehicle brakes is mounted.

Brake booster device 100 includes: a hydraulic brake mechanism 150 that generates the pressure of the hydraulic oil for performing brake control based on the amount of operation of a brake pedal; an electric motor that controls the brake force; a motor control unit 300 that controls the electric motor; and a reservoir 700 that stores the hydraulic oil.

Hydraulic brake mechanism 150 has an axis A that is tilted upward at a sharp angle α (10 to 15°, for example) in the direction from the rear of the vehicle toward the front of the vehicle.

Hydraulic brake mechanism 150 is fixed by bolts 152 to a partition wall W that separates an engine room R1 from a vehicle interior R2. Hydraulic brake mechanism 150 includes a master cylinder 250 and reservoir 700 on one side in the axis direction (on the front side of the vehicle).

The electric motor is housed in a housing 160 of hydraulic brake mechanism 150. As the electric motor, a motor of plural phases such as a three-phase brushless motor is used.

A holding table 170 is formed on an outer circumferential portion of housing 160, on the side of reservoir 700 in this embodiment. Case 302 of motor control unit 300 is fixed onto holding table 170.

As will be described later in detail, motor control unit 300 converts DC power into AC power, and supplies the AC power to the electric motor, to control the driving of the electric motor. A lid 304 made of a metal is provided on case 302 of motor control unit 300. A large number of fins 312 for cooling are provided at lower portions and outer circumferential portions of case 302. Motor control unit 300 is equivalent to an actuator control device according to the present invention.

As described above, motor control unit 300 is integrally incorporated into electric brake booster device 100, so that the troublesome connecting operations required in a case in which a motor control unit and a brake booster device are provided independently of each other can be avoided.

Figure 2:
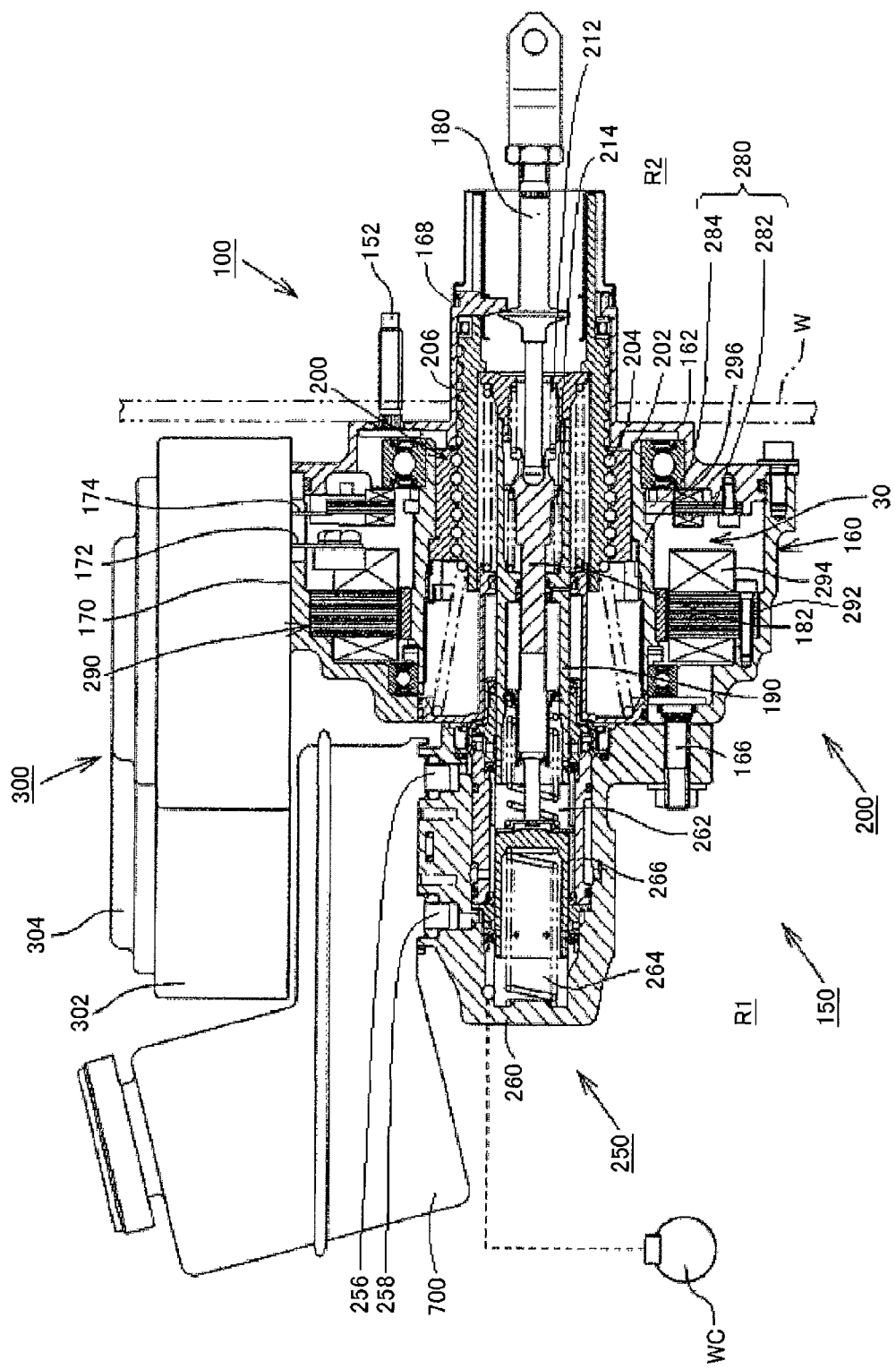
FIG. 2 is a partial cross-sectional view of the brake booster device.

Referring now to FIG. 2, the structures of hydraulic brake mechanism 150 and the electric motor are described. The vehicle rear side of hydraulic brake mechanism 150 protrudes from an opening of partition wall W into vehicle interior R2, and is mechanically connected to the brake pedal (not shown). Based on the amount of operation that is the amount of push on the brake pedal, an input rod 180 moves from the rear side toward master cylinder 250 on the front. Based on the movement of input rod 180, an input piston 182 moves toward master cylinder 250.

Master cylinder 250 has a housing 260. A free piston 266 is inserted through a cylindrical hole formed inside housing 260. A pressure chamber 262 is defined on the vehicle rear side of free piston 266, and a pressure chamber 264 is defined on the front side of free piston 266. Free piston 266 moves in such a manner that the pressure in pressure chamber 262 and the pressure in pressure chamber 264 become basically the same. Here, the hydraulic oil of pressure chamber 262 is supplied from a discharge outlet 252 shown in FIG. 1, and the hydraulic oil of pressure chamber 264 is supplied from a discharge outlet 254 shown in FIG. 1. Accordingly, hydraulic oils of the same pressure are supplied from discharge outlet 252 and discharge outlet 254.

When input piston 182 moves toward master cylinder 250 based on the operation of the brake pedal, the pressure in pressure chamber 262 becomes higher depending on the movement. Because of this increase in pressure, free piston 266 moves toward pressure chamber 264, and the pressure of the hydraulic oil in pressure chamber 264 also becomes higher. The hydraulic oils with increased pressures are sent from discharge outlets 252 and 254 to a fluid-pressure control device (not shown), and are then sent from the fluid-pressure control device to a wheel cylinder WC of the brake provided on each wheel of the vehicle to generate the braking force.

It is difficult to generate sufficient pressures for the hydraulic oils only with the operating force of the brake pedal. Therefore, a control piston 190 is provided, and the electric motor and a movement mechanism 200 are provided to control movement of control piston 190.

The electric motor includes a stator 290 and a rotor 296. Rotor 296 is rotatably supported by a bearing held by a cover 162 and a bearing held by housing 160 of movement mechanism 200. When AC power is supplied from motor control unit 300 to stator 290, rotor 296 rotates, based on the supplied AC power. Stator 290 includes a stator core 292 and a stator winding 294 that is wound around stator core 292. Rotor 296 has permanent magnets that face stator core 292. The permanent magnets form the magnetic poles of rotor 296.

The positions of the magnetic poles of rotor 296 are detected by a resolver 280, and are sent to motor control unit 300. Based on the positions of the magnetic poles of rotor 296, motor control unit 300 generates an AC current. The AC current is supplied to stator winding 294 via a power bus bar 172. Resolver 280 includes a resolver rotor 284 that is provided on rotor 296 and rotates with rotor 296, and a resolver stator 282 that senses the rotational position of resolver rotor 284. Here, the signal indicating the positions of the magnetic poles of rotor 296 is output from resolver stator 282 to motor control unit 300 via a signal line 174.

Rotor 296 of the electric motor has a hollow structure. Movement mechanism 200 that converts the rotative force of the electric motor into a force in the axial direction is provided inside rotor 296. Based on the torque generated by the electric motor, control piston 190 moves in the axial direction. Movement mechanism 200 includes a nut member 202 fixed to hollow rotor 296, balls 204, and a screw member 206. When rotor 296 of the electric motor rotates, nut member 202 rotates. Hollow screw member 206 is engaged with nut member 202 via balls 204. Hollow screw member 206 moves toward one side (front side) or the other side (rear side) in the axial direction, depending on the rotational direction of nut member 202. There are various methods for controlling control piston 190, but a typical control method will be described in the following.

When input piston 182 moves toward master cylinder 250 through an operation of the brake pedal, a difference is caused in the positional relationship between input piston 182 and control piston 190. When the electric motor is controlled to eliminate the movement difference, nut member 202 is rotated by the rotating torque of the electric motor. Accordingly, screw member 206 engaged with nut member 202 moves toward master cylinder 250 in the axial direction.

The forces of input piston 182 and control piston 190 act on pressure chamber 262 of master cylinder 250, and the pressure in pressure chamber 262 becomes higher accordingly. The pressure in pressure chamber 264 is also made higher by the action of free piston 266. Based on the pressures in pressure chamber 262 and pressure chamber 264 (the pressures of the hydraulic oils), the braking force is generated. Return springs that constantly push input piston 182, control piston 190, and free piston 266 to the rear side are provided in pressure chamber 262 and pressure chamber 264 respectively.

When the operation of the brake pedal ends as the brake pedal is released from pressing, input piston 182 and control piston 190 are returned to the original positions on the other side (rear side) in the axial direction by the pushing forces of the return springs as well as the pressures of the hydraulic oils. As a result of this, the pressures of the hydraulic oils return to the states observed prior to the braking.

If input piston 182 and control piston 190 move toward master cylinder 250 in the axial direction at the same speed, the result is as follows. That is, since the force exerted from the pressures of the hydraulic oils is determined by the area of a cross-section perpendicular to the axis, if the area of a cross-section perpendicular to the axis of control piston 190 is made larger than the area of a cross-section perpendicular to the axis of input piston 182, the pressures of the hydraulic oils can be increased with a force several times greater than the force pushing input piston 182. Accordingly, a large braking force can be generated.

If control piston 190 moves toward master cylinder 250 at a higher speed than the speed of movement of input piston 182, a great braking force can be generated with a small amount of operation. If control piston 190 moves at a lower speed than the speed of movement of input piston 182 or moves in the opposite direction, the braking force can be made smaller with respect to the travel distance of input piston 182.

For example, in a case in which the energy of movement of the vehicle is converted into electric power by performing regenerative braking with a vehicle moving motor for moving the vehicle based on the operation of the brake pedal, a braking force is generated by the vehicle moving motor. In this case, the braking force based on the pressures of the above described hydraulic oils may be small or unnecessary. Therefore, control piston 190 is moved at a lower speed than input piston 182, or is moved in the opposite direction from the movement of input piston 182.

A situation where the brake pedal is not pressed or where the brake is not in operation is described below. Input piston 182 is in the position of a non-operating state, and control piston 190 for controlling the pressure of the hydraulic oil of master cylinder 250 is in the position of a non-operating state. Since control piston 190 and input piston 182 are in the positions of non-operating states, free piston 266 is in the position of a non-operating state. Thus, control piston 190 and free piston 266 are on the other side, that is the positions of non-operating state as described above, or on the side of the brake pedal. Therefore, a relief port 256 of pressure chamber 262 and a relief port 258 of pressure chamber 264 are in opened states. In other words, pressure chambers 262 and 264 communicate with reservoir 700 via respective relief ports 256 and 258. Accordingly, pressure chambers 262 and 264 are filled with the hydraulic oil of reservoir 700.

When the brake pedal is pressed, and input piston 182 and control piston 190 move to the left side in FIG. 2 as described above, the passage that connects pressure chambers 262 and 264 to relief ports 256 and 258 is shut off by control piston 190 and free piston 266. With this movement, the hydraulic oil of pressure chamber 262 is compressed, and the pressure thereof becomes higher, in accordance with the travel distances of input piston 182 and control piston 190 as described above. Due to this, free piston 266 moves to the left side in FIG. 2. The hydraulic oil of pressure chamber 264 is then compressed, and the pressure thereof becomes higher accordingly. Based on the pressure, a braking force is generated. A pair of springs as a pushing means are provided between input piston 182 and control piston 190. Those springs function so that the relative positional relationship between input piston 182 and control piston 190 is maintained in a neutral position in a state in which the brake is not in operation.

Next, motor control unit 300 according to the present invention is described in detail.

Figure 3:
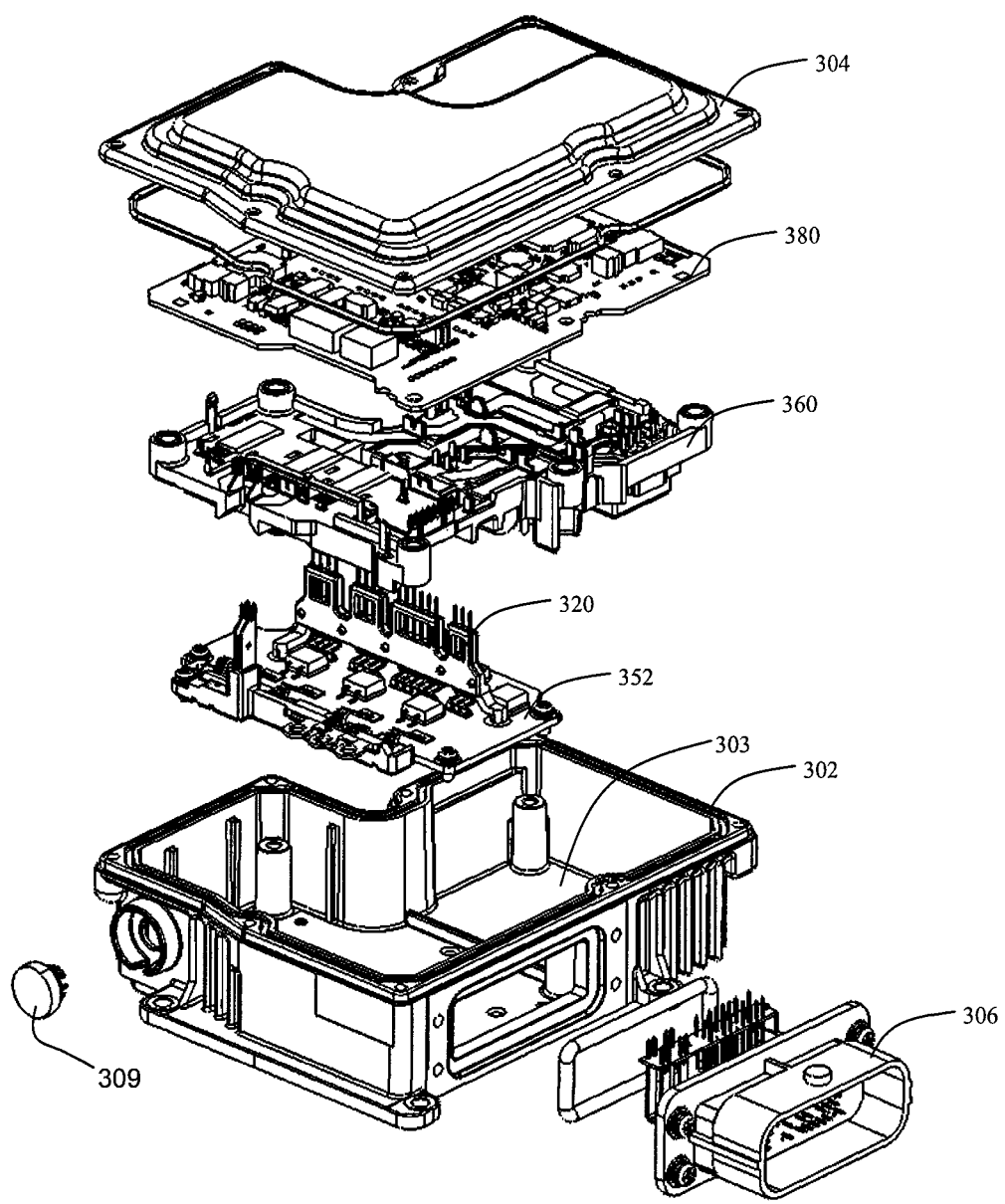
FIG. 3 is a perspective view illustrating the assembling and disassembling of the motor control unit of the brake booster device.

FIG. 3 is a perspective view illustrating the assembling and disassembling of motor control unit 300. As shown in FIG. 3, three circuit substrates that are a power substrate 352, a filter substrate 360, and a control substrate 380 are stacked with a space left between each three substrates in metallic case 302 of motor control unit 300. The upper face of metallic case 302 is sealed with lid 304.

A filter 309 is attached to case 302. Filter 309 restrains a liquid such as water from entering case 302 of motor control unit 300. On the other hand, filter 309 also allows the air to flow between the inside and the outside of case 302 through a respiratory action, so that the pressure in case 302 is restrained from fluctuating and is maintained at a fixed value.

Figure 4:
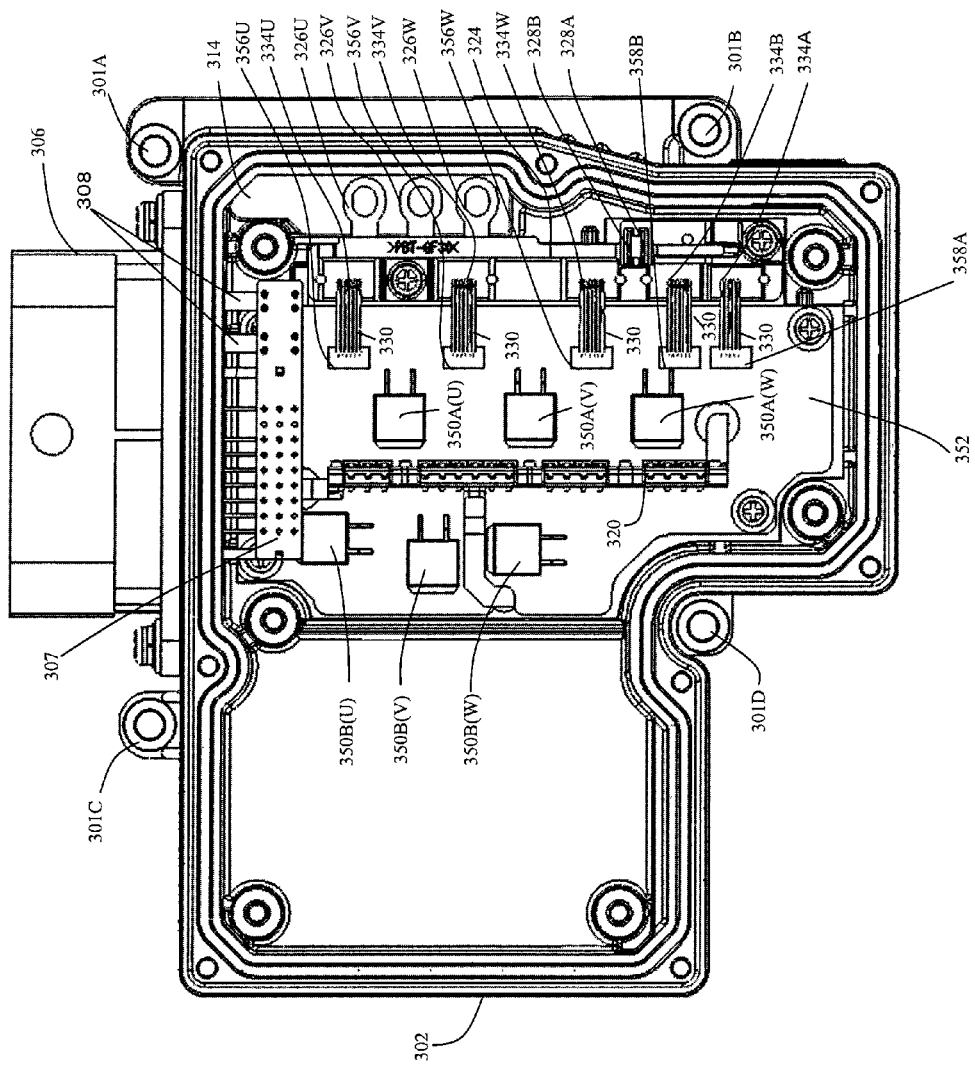
FIG. 4 shows a structure to which the power substrate of the motor control unit is attached.

FIG. 4 is a top view of a structure in which power substrate 352 is attached to case 302. Power substrate 352 is fixed to case 302. Case 302 is made of a metal, and has a bottom face 303. The upper side of case 302 is open for the assembling of the electric components. Fixing members 301A through 301D for fixing case 302 to housing 160 with screws and the likes are provided on the lower external periphery of case 302.

A hole 314 is formed through bottom face 303 of case 302. Hole 314 is designed to supply AC power to the electric motor, and to receive the output signal of resolver 280 attached inside housing 160.

Power substrate 352 is placed on bottom face 303 inside case 302, with grease for radiation being interposed in between. Power substrate 352 is fixed to bottom face 303 of case 302 with screws. Semiconductor devices 350A and 350B are mounted on power substrate 352. Semiconductor devices 350A and 350B constitute an inverter circuit (the drive circuit of the electric motor) that converts DC power into AC power.

In this embodiment, semiconductor devices 350A are power switching semiconductors that function as the upper arms of the U-, V-, and W-phases of the inverter circuit. Semiconductor devices 350B are power switching semiconductors that function as the lower arms of the U-, V-, and W-phases of the inverter circuit. DC terminals 358A and 358B for receiving DC power are provided on power substrate 352. AC terminals 356U, 356V, and 356W of the U-, V-, and W-phases for outputting AC power converted from the DC power are also provided.

A lead frame 320 is provided on power substrate 352. Terminals that supply control signals for drive control of semiconductor devices 350A and 350B from control substrate 380 to semiconductor devices 350A and 350B are aligned on lead frame 320. As the control signals are supplied to semiconductor devices 350A and 350B of the respective arms, semiconductor devices 350A and 350B perform switching operations, and convert DC power into AC power. Lead frame 320 functions not only to transmit the control signals but also to connect signal lines among the respective substrates.

A power terminal member 324 is fixed to case 302, and functions to supply and receive DC and AC power. Power terminal member 324 has a structure formed by burying a conductor in resin. Power terminal member 324 includes DC input terminals 328A and 328B that receive DC power from the later described smoothing capacitor 362 that is mounted on filter substrate 360. Power terminal member 324 also includes DC output terminals 334A and 334B that output the DC power, which is input to power terminal member 324, to power substrate 352. Power terminal member 324 further includes AC input terminals 334U through 334W that receive AC power generated from power substrate 352. Power terminal member 324 also includes AC output terminals 326U through 326W that supply the AC power, which is input to power terminal member 324, to the electric motor.

DC output terminal 334A of power terminal member 324 is connected to DC terminal 358A of power substrate 352 by bonding wires 330. Likewise, DC output terminal 334B is connected to DC terminal 358B by bonding wires 330. Also, AC terminals 356U, 356V, and 356W of power substrate 352 are connected to AC input terminals 334U through 334W of power terminal member 324 by bonding wires 330, respectively.

A connector 306 that is fixed to an opening in a side portion of case 302 includes power terminals 308 for receiving DC power, and a signal terminal 307 for supplying and receiving signals.

Signal terminal 307 is designed to extend vertically upward in case 302, and is soldered to the later described control substrate 380.

Figure 5:
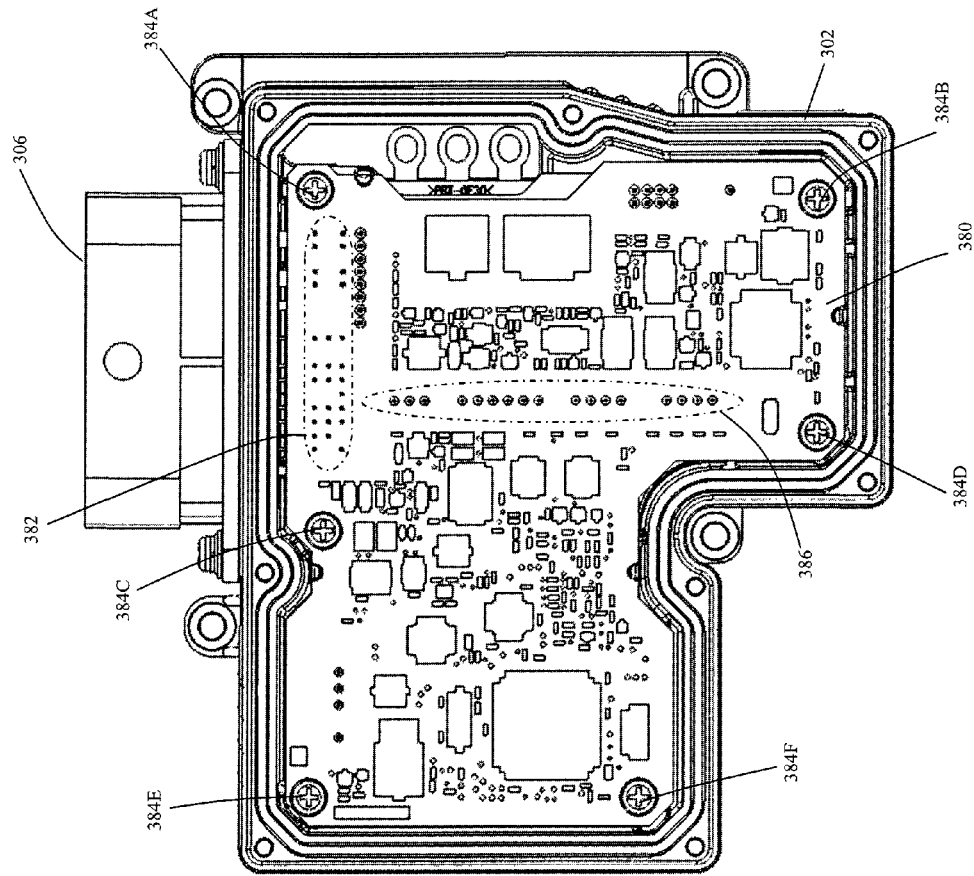
FIG. 5 shows a structure to which the control substrate of the motor control unit is attached.

FIG. 5 is a top view of a structure in which control substrate 380 is attached to case 302. Control substrate 380 is fastened to case 302 in the following manner. Six bolts 384A through 384F penetrate through bolt guiding holes 402 (see FIG. 6) of filter substrate 360, and control substrate 380 as well as filter substrate 360 is screwed to the periphery of the bottom portion of case 302. A control circuit that includes a computer is attached to control substrate 380. In control substrate 380 with this structure, control signals for controlling the driving of the inverter (semiconductor devices 350A and 350B) serving as the drive circuit of the electric motor are generated.

Signal terminal 307 of connector 306 extends vertically upward in case 302, and is connected to a connecting unit 382 of control substrate 380. Further, the terminals of one side of lead frame 320 are connected to power substrate 352, but the terminals of the other side of lead frame 320 are connected to a signal connecting unit 386 of control substrate 380. This connection is performed by soldering the upper ends of the terminals of the other side.

Figure 6:
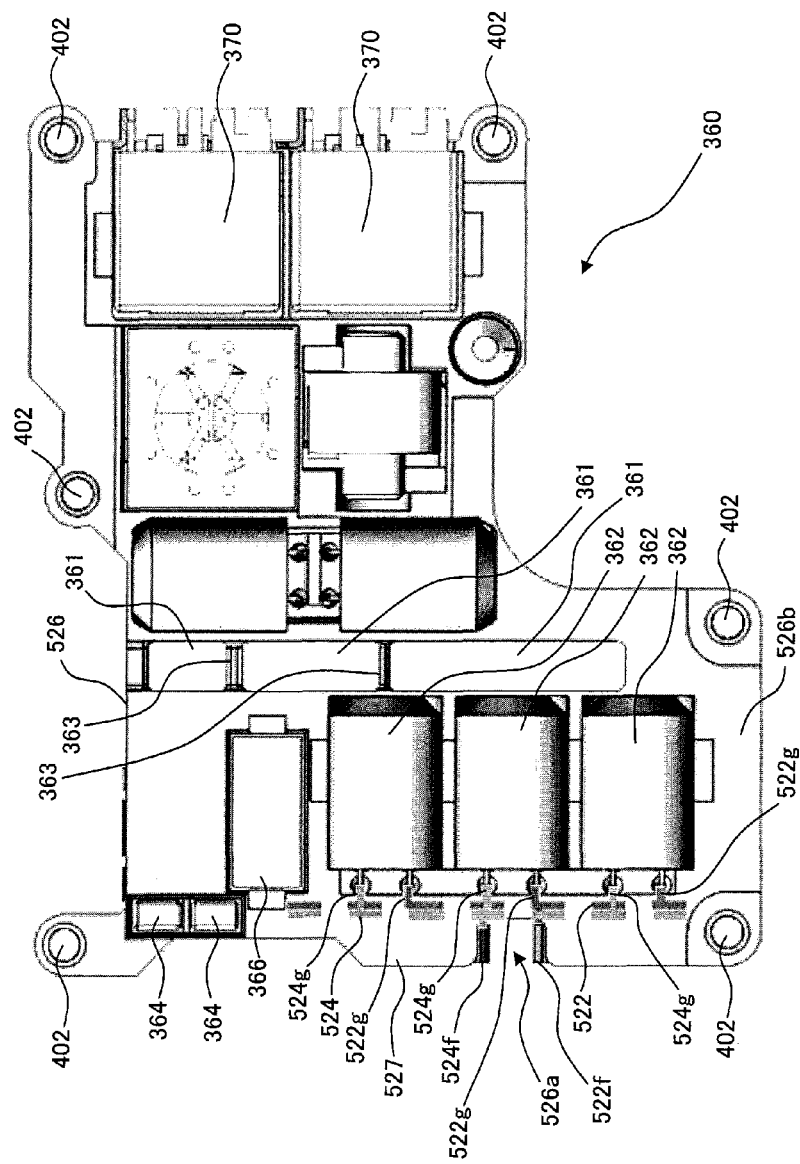
FIG. 6 shows the lower face of the filter substrate of the motor control unit.

FIG. 6 is a view seen from the side of the lower face, which corresponds to the side of bottom face 303 of case 302 when filter substrate 360 having components mounted thereon is attached to case 302.

Filter substrate 360 is provided above power substrate 352 fixed to bottom face 303 of case 302, and is provided below control substrate 380. Filter substrate 360 is housed in case 302 so as to be interposed between power substrate 352 and control substrate 380.

A main body 526 of filter substrate 360 is a resin molding that includes the later described first bus bar and second bus bar, and is made by performing resin-molding such as insert molding or the like with the use of at least two metal molds.

Plural (three, for example) capacitors (electrolytic capacitors) 362 and ceramic filter capacitors 364 are attached to the face that serves as the lower face of filter substrate 360 when filter substrate 360 is attached to case 302. Further, various electronic components forming a noise filter processing circuit is attached to the face to remove noise from a resistor 366 or the like. Relays 370 that provide protection against overcurrent or the like are also attached to the face.

Capacitors 362 smoothen the current to be supplied to the later described power bus bar 522 from a power supply, and restrain instantaneous overcurrent caused by noise. Capacitors 362 also reduce noise and ripple current generated between power bus bar 522 and a ground bus bar 524.

Main body 526 has a pullout slot 526a for the power (positive) line and the ground (negative) line in a peripheral portion 527 in the attachment position of capacitors 362. A power connection terminal 522f that is integrally formed with power bus bar 522 is provided on one side of the peripheral portion of the opening of pullout slot 526a. The DC current supplied from a power supply unit located outside motor control unit 300 via connector 306 is sent to the respective circuits of filter substrate 360 via power connection terminal 522f.

A ground connection terminal 524f that is integrally connected with ground bus bar 524 is placed on the side facing the side on which power connection terminal 522f is placed at the peripheral portion of the opening of pullout slot 526a. The ground current from the respective circuits of filter substrate 360 is sent to the power supply unit via ground connection terminal 524f and connector 306.

Power bus bar 522 and ground bus bar 524 are buried inside main body 526 by performing resin-molding such as insert molding or the like of main body 526. The flat plate-like portions of power bus bar 522 and ground bus bar 524 are located between capacitors 362 and peripheral portion 527 having pullout slot 526a of main body 526. The flat plate-like portions of bus bars 522 and 524 are arranged in parallel with each other along peripheral portion 527, and are arranged to face each other.

The resin between power bus bar 522 and ground bus bar 524 insulate bus bars 522 and 524 from each other.

In this manner, power bus bar 522 functions as the power supply line for supplying the power from the power supply unit to the respective circuits of filter substrate 360. Ground bus bar 524 functions as the ground line of filter substrate 360.

Since the respective flat plate-like portions of power bus bar 522 and ground bus bar 524 are arranged to face each other, the wiring inductances of power bus bar 522 and ground bus bar 524 become lower, canceling each other. Accordingly, the radio noise of power bus bar 522 and ground bus bar 524 can be reduced.

Further, since the respective flat plate-like portions of power bus bar 522 and ground bus bar 524 are arranged in parallel with each other, the wiring inductances of power bus bar 522 and ground bus bar 524 are further lowered. Accordingly, the effect to reduce the radio noise of power bus bar 522 and ground bus bar 524 can be increased.

Power bus bar 522 and ground bus bar 524 are placed between pullout slot 526a and capacitors 362. With this arrangement, capacitors 362 are connected to bus bars 522 and 524 at locations closer to pullout slot 526a, or at locations closer to the power supply unit of filter substrate 360.

In this circuit layout, generation of ripple current at the upstream portion of the power supply path from the power supply unit to the respective circuits of filter substrate 360 can be restrained. Accordingly, heating of the respective circuits of filter substrate 360 can be restrained, and the durability of filter substrate 360 is improved.

The surfaces (the later described sub flat-face portions 522b and 524b) of power bus bar 522 and ground bus bar 524 can be exposed or the like, so that part of power bus bar 522 and part of ground bus bar 524 are not covered with the resin.

Examples of cases in which part of power bus bar 522 and part of ground bus bar 524 are not covered with resin include the following cases: where steps are formed between the surface of the resin of main body 526 and the surfaces of bus bars 522 and 524; and where there are no steps between the resin surface and the surfaces of bus bars 522 and 524, and the surfaces of bus bars 522 and 524 are exposed and are not covered with the resin.

In this case, an insulating material may be used as an additional structure to further reduce short-circuiting that is caused when power bus bar 522 and ground bus bar 524 are put into contact with a conductive foreign matter. For example, an insulating film may be attached or an insulating paint may be applied to the exposed portion of power bus bar 522 or ground bus bar 524.

The resin between power bus bar 522 and ground bus bar 524 may be caused to protrude from the exposed surfaces (the later described sub flat-face portions 522b and 524b) of power bus bar 522 and ground bus bar 524 by resin molding. With this arrangement, the protruding portion can serve as the wall between bus bars 522 and 524.

By virtue of those additional structures, the effect to restrain attachment of conductive foreign matters and restrain short-circuiting between power bus bar 522 and ground bus bar 524 can be increased even further.

Power bus bar 522 and ground bus bar 524 may be completely buried to main body 526. With this arrangement, the effect to reduce short-circuiting due to contact with a conductive foreign matter can be increased even further.

Filter substrate 360 has openings 361 that are divided into plural openings by conductor bridges 363. Lead frame 320 is connected to control substrate 380 above filter substrate 360 through openings 361.

Figure 7:
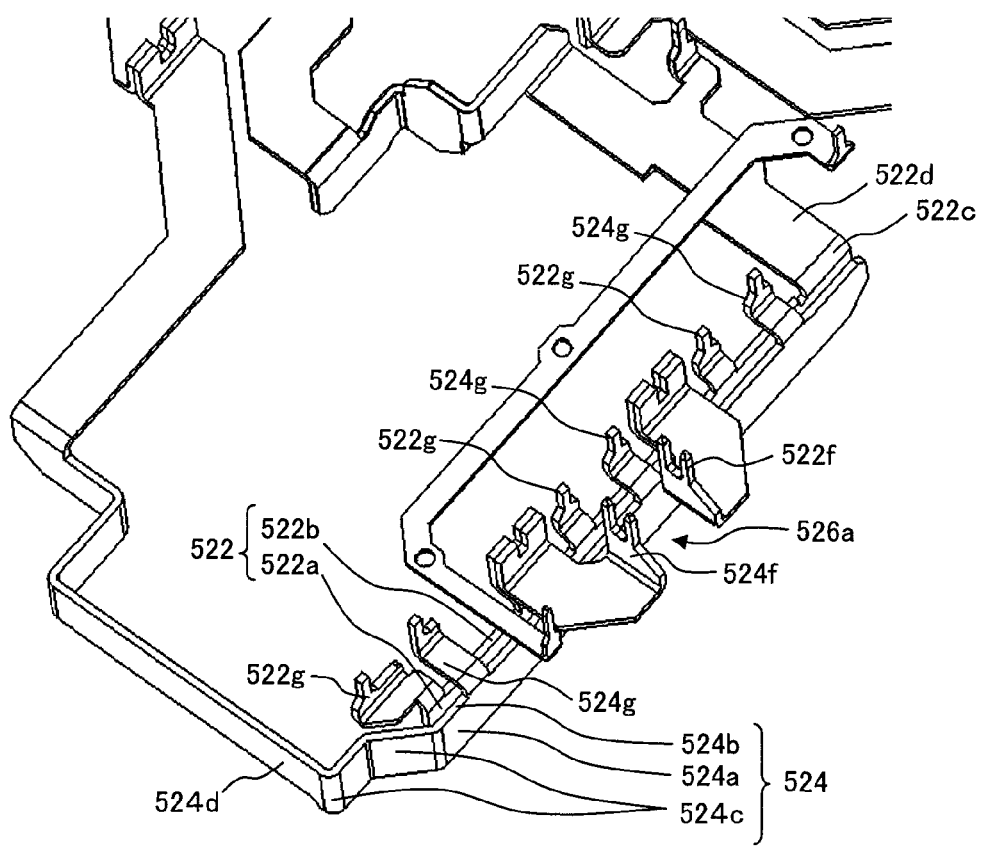
FIG. 7 is a perspective view of bus bars seen from above when the filter substrate of the motor control unit is housed in a case.
Figure 8:
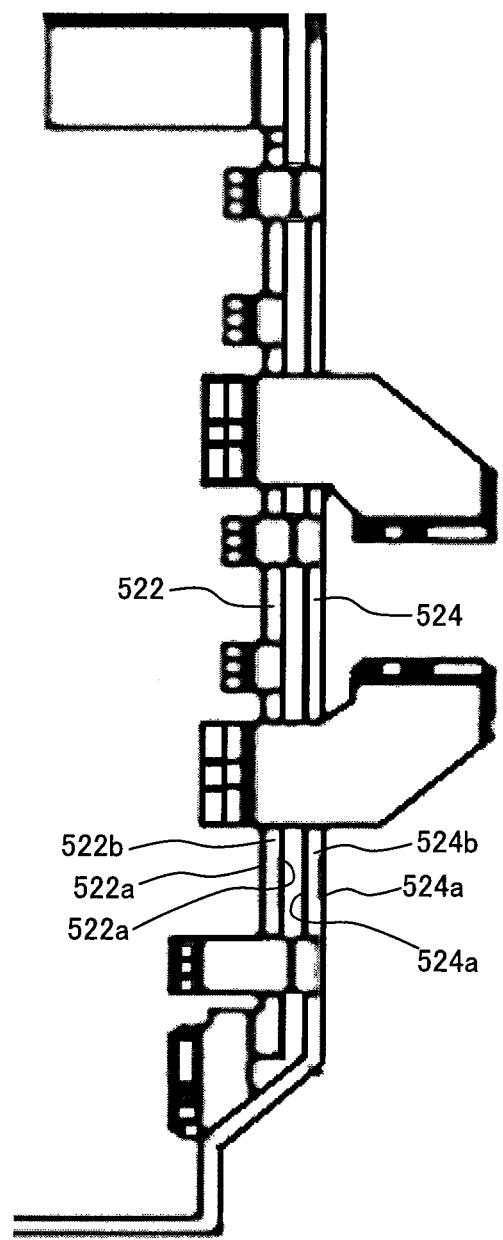
FIG. 8 is a plan view of the bus bars shown in FIG. 7.

Referring now to FIGS. 7 and 8, power bus bar 522 and ground bus bar 524 are described in detail.

FIG. 7 is a perspective view of power bus bar 522 and ground bus bar 524 seen from above in a situation where filter substrate 360 is housed in case 302. Accordingly, FIG. 7 is a perspective view of power bus bar 522 and ground bus bar 524 seen from the side opposite to FIG. 6. FIG. 8 is a plan view of power bus bar 522 and ground bus bar 524. In the following, the vertical positional relations observed where the respective substrates are housed in case 302 are described.

The flat plate-like portions of power bus bar 522 to be the power supply line and ground bus bar 524 to be the ground line are arranged in parallel with each other and are arranged at a distance from each other. The two faces of the flat plate-like portions facing each other and the back faces of those two faces are main flat-face portions 522a and 524a. Each two faces continuing from the upper and lower ends of main flat-face portions 522a and 524a in the width direction are sub flat-face portions 522b and 524b.

Main flat-face portions 522a and 524a have larger surface areas than sub flat-face portions 522b and 524b, and sub flat-face portions 522b and 524b have smaller surface areas than main flat-face portions 522a and 524a.

Plural positive-side connection terminals 522g are provided on power bus bar 522. Positive-side connection terminals 522g are formed to protrude from the top end portion of the flat plate-like portion, and are bent. A plurality of positive-side connection terminals 522g are connected to the positive terminals (not shown) of respective capacitors 362.

Likewise, plural negative-side connection terminals 524g are provided on ground bus bar 524. Negative-side connection terminals 524g are formed to protrude from top end portions of the flat plate-like portion, and are bent. A plurality of negative-side connection terminals 524g are connected to the negative terminals (not shown) of respective capacitors 362.

Terminal members that are formed to be bent separately from other components are welded to terminal portions that are formed to protrude from top end portions of the flat plate-like portions of power bus bar 522 and ground bus bar 524 and to be bent. In this manner, power connection terminal 522f and ground connection terminal 524f are provided. With this arrangement, power from outside is supplied to the respective circuits of filter substrate 360 via power connection terminal 522f. On the other hand, filter substrate 360 is grounded through ground connection terminal 524f.

Power connection terminal 522f and ground connection terminal 524f are arranged to face each other at pullout slot 526a, as described above.

The upper side portion at one top end (the right side in FIG. 7) of the flat plate-like portion of power bus bar 522 is extended in a direction perpendicular to the longitudinal direction of the flat plate-like portion. This extended portion is bent toward the inside of main body 526 at a top end portion of the flat plate-like portion, to form an extension portion 522d. Extension portion 522d extends from a bent portion 522c toward the periphery of filter substrate 360.

The top end portion of ground bus bar 524 on the opposite side (the left side in FIG. 7) from the side on which extension portion 522d of power bus bar 522 is formed is extended in the longitudinal direction of the flat plate-like portion. This extended portion is bent toward the inside of main body 526 at a top end portion of the flat plate-like portion, to form an extension portion 524d. Extension portion 524d extends from a bent portion 524c toward the periphery of filter substrate 360.

With bent portions 522c and 524c being provided, power bus bar 522 and ground bus bar 524 can have greater strengths against the resin injection pressure in the metal molds when power bus bar 522 and ground bus bar 524 are buried in resin.

The above effect can be achieved by providing only one of bent portions 522c and 524c on power bus bar 522 or ground bus bar 524. However, to increase the strengths of both power bus bar 522 and ground bus bar 524, it is preferable to provide both bent portions 522c and 524c on power bus bar 522 and ground bus bar 524.

As for power bus bar 522, bent portion 522c is bent at an upper edge portion of the flat plate-like portion, and therefore, there is fear that the costs become higher with the complication of the processing prior to the resin molding. To avoid this, extension portion 522d may be joined to the flat plate-like portion by welding prior to the resin molding so that the costs can be lowered.

Alternatively, like bent portion 524c, bent portion 522c may be bent at a top end portion of main flat-face portions 522a.

The space between the respective flat plate-like portions of power bus bar 522 and ground bus bar 524 is filled with resin when main body 526 of filter substrate 360 is resin-molded.

Figure 9A:
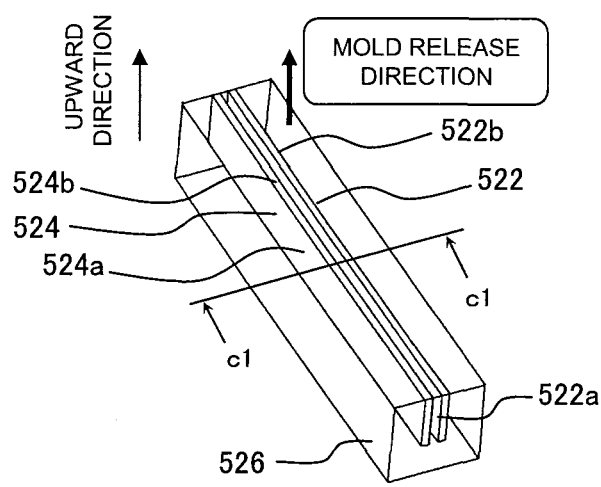
FIGS. 9A and 9B are diagrams for explaining the resin molding performed in the first embodiment of the present invention.
Figure 9B:
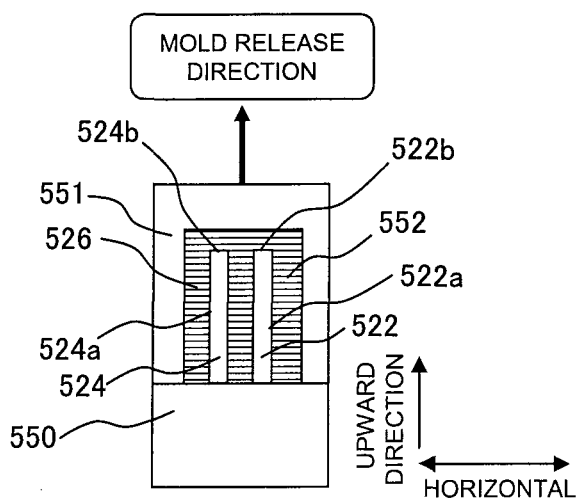

Referring now to FIGS. 9A and 9B, resin-molding main body 526 of filter substrate 360 is described.

When main body 526 is resin-molded, two metal molds (metal molds formed by dividing a mold into two) are used in the first embodiment. Power bus bar 522 and ground bus bar 524 are positioned and secured in those metal molds, and resin is injected into the metal molds, followed by molding.

As shown in FIG. 9B, the metal molds are a pair of a fixed metal mold 550 and a movable metal mold 551. Movable metal mold 551 is detachably in contact with fixed metal mold 550. A resin injection portion 552 that is a space into which resin is to flow is formed inside movable metal mold 551. Resin injection portion 552 is designed to conform to the contours of main body 526 of filter substrate 360. Resin injection portion 552 is open on the side of fixed metal mold 550.

In this embodiment, movable metal mold 551 moves upwardly away from fixed metal mold 550, as shown in FIG. 9B.

On the other hand, convex portions (not shown) conforming to the shapes of the components to be mounted is formed in fixed metal mold 550 to mold the mounting portions of the various components.

Power bus bar 522 and ground bus bar 524 are positioned by fixed metal mold 550 and secured thereto.

When power bus bar 522 and ground bus bar 524 are positioned by fixed metal mold 550, respective upper sub flat-face portions 522b and 524b, and power connection terminal 522f, ground connection terminal 524f, positive-side connection terminals 522g, and negative-side connection terminals 524g that are connected to upper sub flat-face portions 522b and 524b are brought into direct contact with fixed metal mold 550, and are positioned. Fixed metal mold 550 is designed to have the shape to be engaged with the complicated shapes of those connection terminals, so that the accuracy of positioning bus bars 522 and 524 at the time of resin molding becomes higher.

Meanwhile, respective lower portions of power bus bar 522 and ground bus bar 524 are housed in movable metal mold 551. In other words, a lower flat face 526b (see FIG. 6) of main body 526 is formed by movable metal mold 551 in this embodiment.

There are almost no steps formed between lower flat face 526b of main body 526 of filter substrate 360 and respective lower sub flat-face portions 522b and 524b of power bus bar 522 and ground bus bar 524. Accordingly, the surfaces of respective sub flat-face portions 522b and 524b are not covered with resin, and are exposed.

Power bus bar 522 and ground bus bar 524 may be completely sealed with resin. With such arrangement, short-circuiting caused by electric contact between power bus bar 522 and ground bus bar 524 via a conductive foreign matter can be restrained. However, filter substrate 360 becomes thicker, as power bus bar 522 and ground bus bar 524 including sub flat-face portions 522b and 524b are sealed in resin. Where at least part of each of sub flat-face portions 522b and 524b is not covered with resin and is exposed, on the other hand, the resin for covering respective sub flat-face portions 522b and 524b becomes unnecessary. Accordingly, filter substrate 360 can be made thinner and lighter.

In this embodiment, resin injection portion 552 is provided only in movable metal mold 551. However, the present invention is not limited to that, and resin injection portion 552 may be provided only in fixed metal mold 550, or may be provided in both movable metal mold 551 and fixed metal mold 550.

In a case in which resin injection portion 552 is formed in fixed metal mold 550, sub flat-face portions 522b and 524b of power bus bar 522 and ground bus bar 524 can be positioned by bringing sub flat-face portions 522b and 524b into direct contact with fixed metal mold 550. In this manner, sub flat-face portions 522b and 524b are exposed, and filter substrate 360 can be made thinner and lighter.

Respective sub flat-face portions 522b and 524b of power bus bar 522 and ground bus bar 524 may not be brought into direct contact with fixed metal mold 550. Instead, an independent mold may be set in fixed metal mold 550, and positioning may be performed by placing power bus bar 522 and ground bus bar 524 in the independent mold. Sub flat-face portions 522b and 524b may be exposed without being covered with resin also in this case.

When power bus bar 522 and ground bus bar 524 are supported by fixed metal mold 550, the facing direction in which main flat-face portions 522a of power bus bar 522 and main flat-face portions 524a of ground bus bar 524 face each other is set in a different direction from the detaching direction of movable metal mold 551.

For example, in a case in which fixed metal mold 550 is placed on the lower side, movable metal mold 551 is placed on the upper side of fixed metal mold 550, and movable metal mold 551 is detachable in the vertical direction as shown in FIG. 9B, the facing direction of main flat-face portions 522a and 524a of power bus bar 522 and ground bus bar 524 is the transverse direction (the horizontal direction) in FIG. 9B. Accordingly, the facing direction of main flat-face portions 522a and 524a is almost perpendicular to the detaching direction of movable metal mold 551.

After movable metal mold 551 is moved closer to fixed metal mold 550 and is connected to fixed metal mold 550, resin is introduced into resin injection portion 552 of the metal molds. After cooling and hardening, main body 526 is resin-molded.

As described above, power connection terminal 522f, ground connection terminal 524f, positive-side connection terminals 522g, negative-side connection terminals 524g, and the likes on the lower end sides of power bus bar 522 and ground bus bar 524 are engaged with fixed metal mold 550, and are thus grasped by fixed metal mold 550. Accordingly, the lower end sides are supported in a stable manner. On the other hand, the upper end sides of power bus bar 522 and ground bus bar 524 are located in resin injection portion 552, and are not supported by movable metal mold 551. Therefore, there is fear that the upper end sides are deformed by the resin injection pressure.

To counter this problem, power bus bar 522 and ground bus bar 524 have the strengths increased by bent portion 522c and bent portion 524c formed in power bus bar 522 and ground bus bar 524, respectively, in this embodiment. Accordingly, deformation of power bus bar 522 and ground bus bar 524 by the resin injection pressure can be restrained. With the increased strengths, contact between power bus bar 522 and ground bus bar 524 due to approaching each other, or short-circuiting between power bus bar 522 and ground bus bar 524 at the time of energization can be restrained. Thus, production of defective filter substrates 360 can be restrained.

Prior to the resin molding in the metal molds, a resin plate that insulates power bus bar 522 and ground bus bar 524 from each other may be inserted between power bus bar 522 and ground bus bar 524. With this arrangement, the effect to restrain power bus bar 522 and ground bus bar 524 from approaching each other due to the resin injection pressure can be increased. Accordingly, the effect to reduce defective filter substrates 360 can be increased.

If power bus bar 522 and ground bus bar 524 are deformed when resin is injected into the resin injection portion 552, the resin plate is also deformed, conforming to the deformation of the bus bars in performing resin molding. Accordingly, the resin plate is prevented from being detached from power bus bar 522 and ground bus bar 524 at the portions sandwiching the resin plate, and formation of bubbles in the resin of main body 526 can be restrained.

Main body 526 of filter substrate 360 molded as described above, has the structure shown in FIG. 9A, and more specifically, has the structure shown in FIG. 6.

FIGS. 9A and 9B illustrate the portion of main body 526 at which power bus bar 522 and ground bus bar 524 are buried in resin. As shown in FIG. 3, the lower face side of filter substrate 360 that corresponds to the side of bottom face 303 of case 302 when filter substrate 360 having the components mounted thereon is attached to case 302, is formed by movable metal mold 551. The upper face side of filter substrate 360 that corresponds to the side of lid 304 of case 302 is formed by fixed metal mold 550. Further, the direction from the upper face side to the lower face side is the direction in which movable metal mold 551 is detached from fixed metal mold 550, or the mold release direction of movable metal mold 551.

Accordingly, FIG. 9A is a perspective view seen from the side of movable metal mold 551, or a perspective view seen from above when lower flat face 526b of main body 526 shown in FIG. 6 is placed on the upper side.

When main body 526 is resin-molded in this embodiment, power bus bar 522 and ground bus bar 524 are supported by fixed metal mold 550. However, the present invention is not limited to that. Instead, power bus bar 522 and ground bus bar 524 may be supported by movable metal mold 551 so that bus bars 522 and 524 are positioned by movable metal mold 551. Since movable metal mold 551 easily has misalignment with respect to fixed metal mold 550 during movement, the accuracy of positioning power bus bar 522 and ground bus bar 524 might become lower. Therefore, it is preferable to support bus bars 522 and 524 with fixed metal mold 550.

In a case in which resin molding is performed with a resin molding machine in which all the metal molds are movable metal molds, it is preferable to support power bus bar 522 and ground bus bar 524 with the movable metal mold having the shortest detachment distance. By shortening the detachment distance in this manner, misalignment of the movable metal mold can be restrained. Accordingly, the accuracy of positioning bus bars 522 and 524 can be made higher.

Referring now to reference examples where the problems to be solved by this embodiment are caused as shown in FIGS. 10A through 11B, the problems to be solved by this embodiment are described.

Figure 10A:
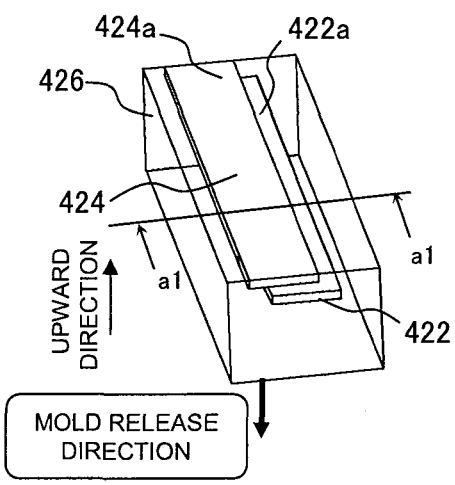
FIGS. 10A and 10B illustrate a reference example of resin molding.
Figure 10B:
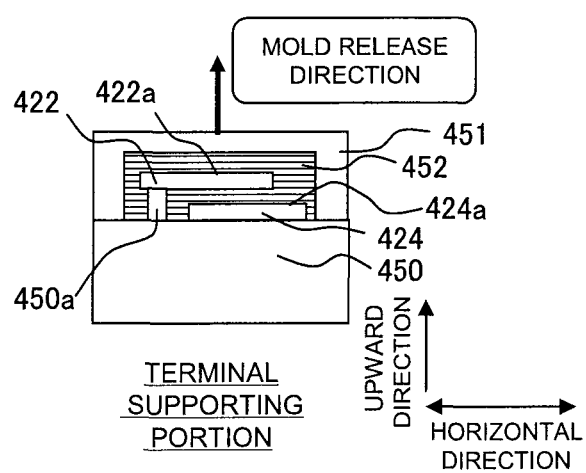

FIG. 10A is a perspective view showing the portion at which flat plate-like bus bars 422 and 424 are disposed in a main body 426 that is resin-molded. FIG. 10B is a cross-sectional view showing a situation where bus bars 422 and 424 are placed in metal molds, taken along the line a1-a1 of FIG. 10A.

Figure 11A:
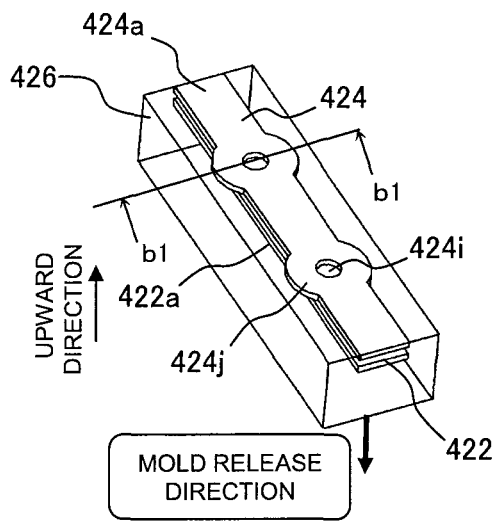
FIGS. 11A and 11B illustrate a reference example of resin molding.
Figure 11B:
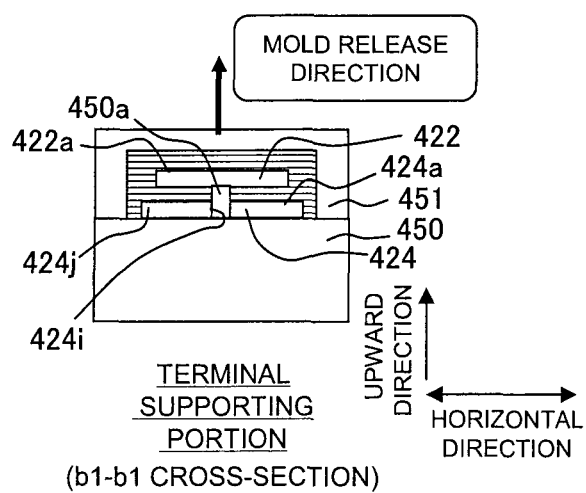

FIG. 11A illustrates a different reference example from the reference example illustrated in FIGS. 10A and 10B, and is a perspective view showing the portion at which bus bars 422 and 424 are disposed in main body 426 that is resin-molded. FIG. 11B is a cross-sectional view showing a situation where bus bars 422 and 424 are placed in metal molds, taken along the line b1-b1 of FIG. 11A.

Main body 426 is equivalent to main body 526 of this embodiment.

In FIGS. 10A and 11A, the downward direction in the drawings (the side of bus bar 422) is the direction in which a movable metal mold 451 is detached from a fixed metal mold 450 (the mold release direction of movable metal mold 451). In FIGS. 10B and 11B, the upward direction is the mold release direction of movable metal mold 451.

FIGS. 10A and 10B differ from FIGS. 11A and 11B in the arrangement of bus bars 422 and 424, and part of the shapes of bus bars 422 and 424.

In those reference examples, the facing direction in which main flat-face portions 422a of bus bar 422 and main flat-face portions 424a of bus bar 424 face each other is the same as the direction (the mold release direction) in which movable metal mold 451 is detached from fixed metal mold 451.

Since the accuracy of positioning bus bars 422 and 424 can be improved by fixing bus bars 422 and 424 to fixed metal mold 450 as described above, bus bars 422 and 424 are expected to be fixed to fixed metal mold 450.

However, if the facing direction of main flat-face portions 422a and 424a is the same as the detaching direction of movable metal mold 451, the following problem occurs. That is, even if fixed metal mold 450 tries to support bus bar 422 on the side of movable metal mold 451, bus bar 424 placed on the side of fixed metal mold 450 causes interference between fixed metal mold 450 and bus bar 422. As a result, it is difficult to support bus bar 422. To counter this problem, bus bar 422 needs to shift in the width direction or in a direction perpendicular to the detaching direction of movable metal mold 451, as shown in FIGS. 10A and 10B. Also, fixed metal mold 450 needs to have a holding portion 450a that secures and holds bus bar 422.

In resin-molded main body 426 having bus bars 422 and 424 arranged in this manner, the width direction of bus bars 422 and 424 is the same as the transverse direction of main body 426. Furthermore, bus bars 422 and 424 are displaced from each other in the width direction. Therefore, the space occupied by bus bars 422 and 424 becomes larger in the transverse direction (the horizontal direction) of main body 426. This results in an increase in size of main body 426.

In view of this, if the arrangement of bus bars 422 and 424 shown in FIGS. 10A and 10B is applied to filter substrate 360 of motor control unit 300 of this embodiment, main body 526 of filter substrate 360 becomes larger, and even motor control unit 300 might become larger.

The positions of bus bars 422 and 424 are displaced from each other in the width direction. Therefore, the effect of bus bars 422 and 424 canceling and lowering the wiring inductance of each other to reduce radio noise might become smaller.

In FIGS. 11A and 11B, two through holes 424i are formed in bus bar 424 located on the side of fixed metal mold 450. To compensate for the decrease in the area of main flat-face portions 424a of bus bar 424 due to the formation of through holes 424i, the portions around through holes 424i in sub flat-face portions 424b of bus bar 424 are expanded in the width direction to form expanded portions 424j.

Further, two holding portions 450a that protrude toward movable metal mold 451 are formed on fixed metal mold 450.

While bus bars 422 and 424 are overlapped on each other, two holding portions 450a are inserted into two through holes 424i of bus bar 424. In this manner, bus bar 422 on the side of movable metal mold 451 is held by the top ends of holding portions 450a. Alternatively, only one through hole 424i may be formed in bus bar 424.

In this structure, however, the facing direction of main flat-face portions 422a and 424a of bus bars 422 and 424 is also the same as the detaching direction of the metal molds. Accordingly, the width direction of bus bars 422 and 424 is the same as the transverse direction of main body 426. Therefore, the space occupied by bus bars 422 and 424 becomes larger in the transverse direction (the horizontal direction) of main body 426. This results in an increase in size of main body 426.

In view of this, if the arrangement of bus bars 422 and 424 shown in FIGS. 11A and 11B is applied to filter substrate 360 of motor control unit 300 of this embodiment, main body 526 of filter substrate 360 also becomes larger, and motor control unit 300 might become larger.

Since the shape of one of bus bars 422 and 424 needs to differ from the shape of the other one, the costs become higher. Furthermore, due to the difference in shape between the two bus bars, the effect of bus bars 422 and 424 canceling and lowering the wiring inductance of each other to reduce radio noise might become smaller.

In this embodiment, on the other hand, the facing direction of main flat-face portions 522a and 524a of power bus bar 522 and ground bus bar 524 is different from the detaching direction of movable metal mold 551. Also, as shown in FIG. 9B, main flat-face portions 522a and 524a stand in the vertical direction of main body 526, so that power bus bar 522 and ground bus bar 524 are arranged to be vertically long. With this arrangement, the space occupied by main body 526 can be prevented from becoming larger in the horizontal direction in this embodiment. Accordingly, main body 526 and motor control unit 300 can be made smaller in size.

Since power bus bar 522 and ground bus bar 524 are arranged to be vertically long as described above, main body 526 might become thicker. However, this hardly results in an increase in size of main body 526 substantially. The reason for this is that, compared with the widths of bus bars 522 and 524 (or the thickness of main body 526), the diameter of each component mounted on main body 526 is large, or main body 526 is required to have a great thickness in relation to the wiring layout, for example.

Also, as the flat plate-like portions of power bus bar 522 and ground bus bar 524 are placed to face each other, the wiring inductances of power bus bar 522 and ground bus bar 524 cancel each other and become lower. Accordingly, radio noise can be reduced.

Furthermore, as the flat plate-like portions of power bus bar 522 and ground bus bar 524 facing each other are placed in parallel with each other, the wiring inductances can be made even lower, and the effect to reduce radio noise can be increased.

The effect to lower the wiring inductances can also be increased by causing power bus bar 522 and ground bus bar 524 to have flat plate-like portions of the same shapes facing each other.

Power bus bar 522 and ground bus bar 524 are provided between pullout slot 526a and capacitors 362. Power bus bar 522 functions as the power supply line, and ground bus bar 524 functions as the ground line. Those bus bars 522 and 524 are connected to capacitors 362. Accordingly, capacitors 362 are connected to bus bars 522 and 524 (more particularly, the flat plate-like portions facing each other) at locations closer to pullout slot 526a or at locations closer to the power supply unit of filter substrate 360.

With this arrangement, generation of ripple current at the upstream portions of the respective circuits of filter substrate 360 can be restrained when power is supplied to those circuits. Accordingly, heating of the respective circuits of filter substrate 360 can be restrained, and the durability of those circuits can be improved.

Also, both power bus bar 522 and ground bus bar 524 can be fixed directly to fixed metal mold 550. Accordingly, interference between bus bars 522 and 524 as illustrated in FIGS. 10A through 11B can be restrained at the time of the fixing.

In this structure, power bus bar 522 and ground bus bar 524 do not need to have different shapes from each other to be fixed to fixed metal mold 550. Accordingly, power bus bar 522 and ground bus bar 524 can be formed to have the same shape. Thus, an increase in costs of filter substrate 360 and motor control unit 300 can be prevented, as the number of components types is not increased.

Figure 12A:
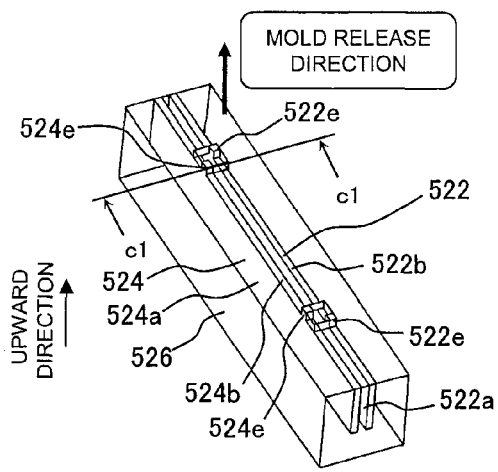
FIGS. 12A through 12C are diagrams for explaining the resin molding performed in a second embodiment of the present invention.
Figure 12B:
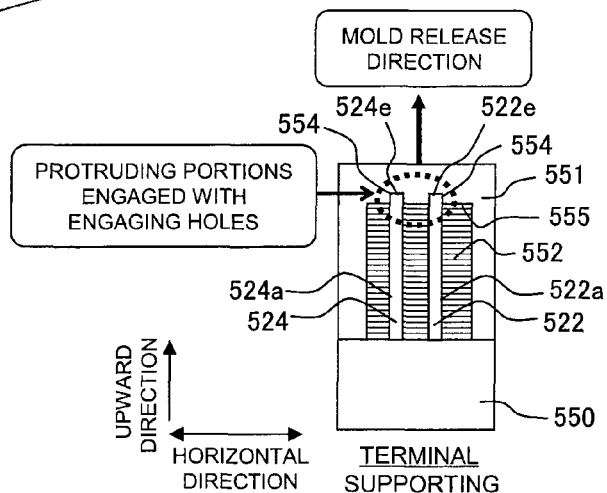
Figure 12C:
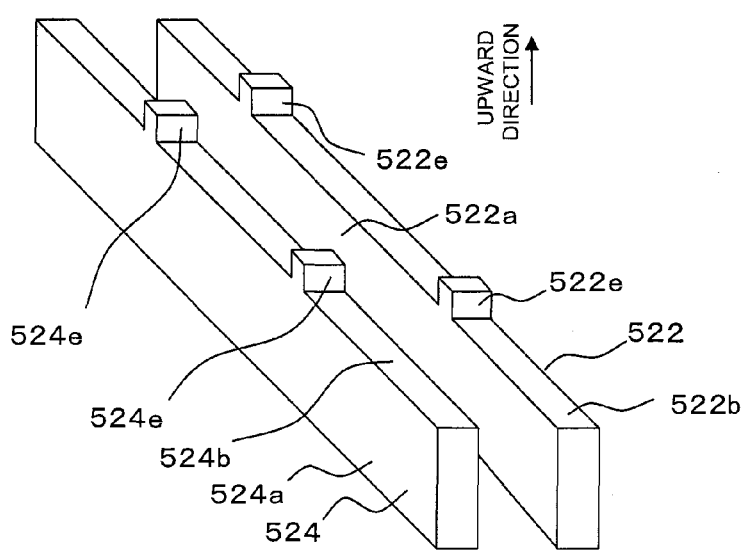

Referring now to FIGS. 12A through 12C, a second embodiment of the present invention is described.

This embodiment basically concerns the same structure as that of the first embodiment. Therefore, the different points from the first embodiment are mainly described below.

Like FIGS. 9A and 9B, FIGS. 12A through 12C illustrate the portion at which power bus bar 522 and ground bus bar 524 of main body 526 are buried in resin.

As in the first embodiment, the lower face of filter substrate 360 in a state in which filter substrate 360 is attached to case 302 is formed by movable metal mold 551. The upper face of filter substrate 360 to be on the side of lid 304 of case 302 is formed by fixed metal mold 550. The lower face of filter substrate 360 faces the direction in which movable metal mold 551 is detached from fixed metal mold 550, or in the mold release direction of movable metal mold 551.

Filter substrate 360 has a plurality of capacitors 362, a plurality of positive-side connection terminals 522g are formed on power bus bar 522, and a plurality of negative-side connection terminals 524g are provided on ground bus bar 524, as in the first embodiment.

The second embodiment differs from the first embodiment in that protruding portions 522e and 524e to be engaged with movable metal mold 551 are formed on sub flat-face portions 522b and 524b that are located on the side of movable metal mold 551 when the flat plate-like portions of power bus bar 522 and ground bus bar 524 are buried in resin.

FIG. 12C is an enlarged view of the flat plate-like portions at which power bus bar 522 and ground bus bar 524 shown in FIG. 12A are placed to face each other.

Protruding portions 522e of power bus bar 522 protrude from sub flat-face portions 522b in the width direction of power bus bar 522. The number of protruding portions 522e is one to three (two of them are shown in this embodiment), for example. The thickness of each of protruding portions 522e is the same as the thickness of each of sub flat-face portions 522b.

Like power bus bar 522, ground bus bar 524 also has protruding portions 524e formed thereon. Protruding portions 524e protrude from sub flat-face portions 524b in the width direction of ground bus bar 524. The number of protruding portions 524e is one to three (two of them are shown in this embodiment), for example. The thickness of each of protruding portions 524e is the same as the thickness of each of sub flat-face portions 524b.

In this embodiment, a pair of protruding portions 524e are provided at locations between a pair of protruding portions 522e in the longitudinal direction of a flat plate portion 524h.

Protruding portions 522e and 524e are preferably provided on sub flat-face portions 522b and 524b on the opposite side from sub flat-face portions 522b and 524b on which positive-side connection terminals 522g and negative-side connection terminals 524g are provided.

Engaging holes 554 to be engaged with respective protruding portions 522e and 524e are formed in movable metal mold 551. Engaging holes 554 are engaged with protruding portions 522e and 524e of power bus bar 522 and ground bus bar 524 when movable metal mold 551 is joined to fixed metal mold 550 for resin molding.

As protruding portions 522e and 524e are engaged with engaging holes 554 at the time of resin molding, power bus bar 522 and ground bus bar 524 are positioned by the metal molds with higher precision and are held thereby.

As respective protruding portions 522e and 524e are positioned and held by movable metal mold 551 as described above, the strengths of entire bus bars 522 and 524 are increased. Accordingly, the effect to restrain deformation of power bus bar 522 and ground bus bar 524 against the resin injection pressure can be increased.

With this arrangement, mutual contact due to deformation of power bus bar 522 and ground bus bar 524 can be restrained. Accordingly, short-circuiting can be restrained when bus bars 522 and 524 are energized after the components are mounted on main body 526, and production of defective filter substrates 360 can be restrained.

Figure 13:
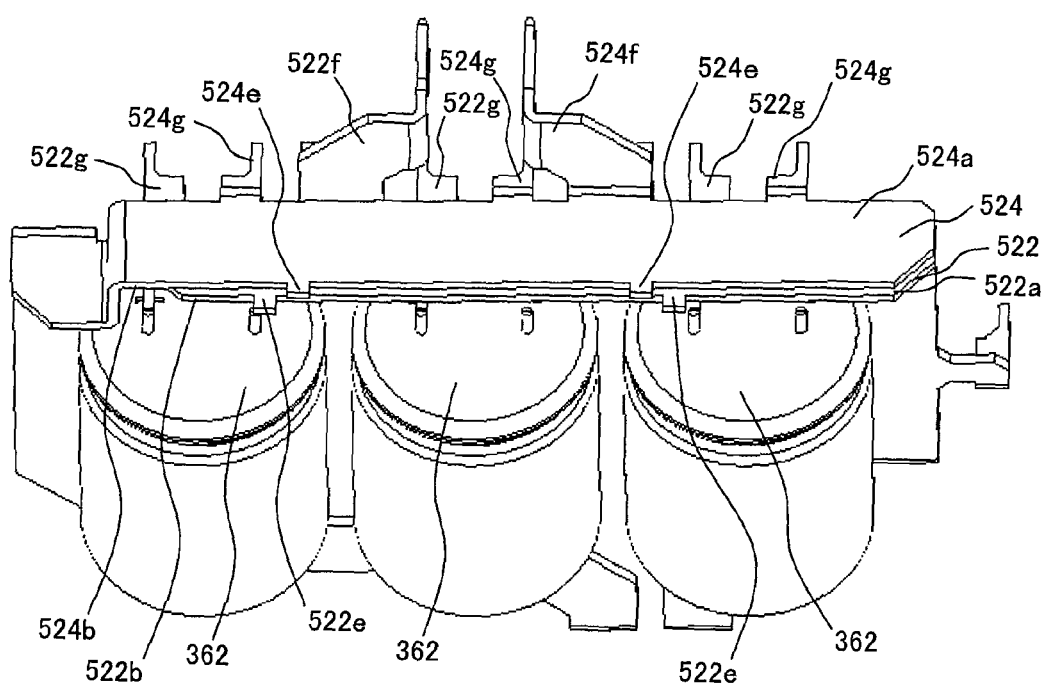
FIG. 13 is a perspective view of the protruding portions shown in FIGS. 12A through 12C.

Particularly, as shown in FIG. 13, it is preferable to provide protruding portions 522e at locations interposed between positive-side connection terminals 522g in the longitudinal direction of a flat plate portion 522h. It is also preferable to provide protruding portions 524e at locations interposed between negative-side connection terminals 524g in the longitudinal direction of flat plate portion 524h.

With this arrangement, the strength against the resin injection pressure can be further increased in the region where the allowable amount of deformation of power bus bar 522 and ground bus bar 524 needs to be made small, or at the flat plate-like portions at which bus bars 522 and 524 face each other and which are at short distances from the positions of the mounted electronic components such as capacitors 362.

In this manner, power bus bar 522 and ground bus bar 524 can be further restrained from being deformed by the resin injection pressure. Accordingly, the effect to restrain short-circuiting due to mutual contact between bus bars 522 and 524 and production of defective filter substrates 360 can be further increased.

Figure 14A:
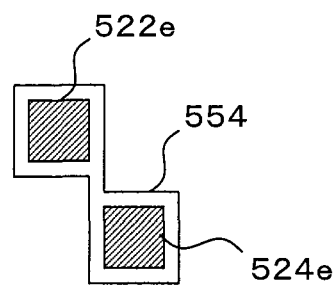
FIGS. 14A through 14C show examples of engaging holes and the peripheral structures in the movable metal mold of the second embodiment of the present invention, seen from the opposite side from the mold release direction.
Figure 14B:
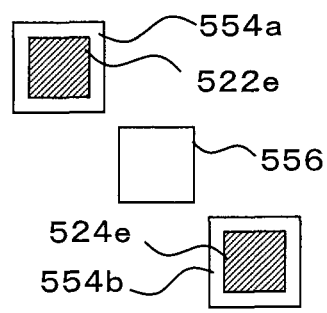
Figure 14C:
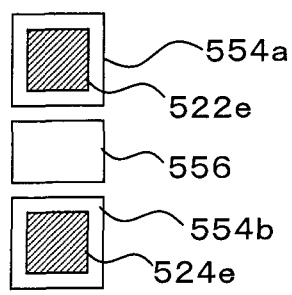

FIGS. 14A through 14C show different examples of engaging holes 554 and their surrounding structures, seen from the opposite side from the mold release direction (the side of fixed metal mold 550).

In the example shown in FIG. 14A, one engaging hole 554 is formed to be engaged with two protruding portions 522e and 524e. More specifically, this engaging hole 554 has two engaging portions to be engaged with protruding portions 522e and 524e. The two engaging portions are designed to have such sizes as to be smoothly engaged with protruding portions 522e and 524e, despite dimension errors of protruding portions 522e and 524e and positional errors of the bus bars caused at the time of resin molding. Furthermore, one engaging hole 554 are formed in such a way that the peripheral portions of the two engaging portions are joined to each other. Protruding portions 522e and 524e are allowed to move a certain amount in the engaging portions corresponding to protruding portions 522e and 524e in engaging hole 554. However, the external size of engaging hole 554 is set so that protruding portions 522e and 524e are not brought into contact with each other.

With this arrangement, protruding portions 522e and 524e are restrained from approaching each other at the time of resin molding. Accordingly, the flat plate-like portions of power bus bar 522 and ground bus bar 524 are maintained at an appropriate distance from each other. Thus, preferable insulating properties can be secured between bus bars 522 and 524.

In the example shown in FIG. 14B, engaging hole 554 is formed to be divided into two holes: an engaging hole 554a with which protruding portion 522e is engaged; and an engaging hole 554b with which protruding portion 524e is engaged. An insulating hole 556 is formed at a location between engaging holes 554a and 554b. This insulating hole 556 is filled with resin at the time of resin molding. After a hardening process, the filling resin is integrated with main body 526, and turns into a wall that stands between protruding portion 522e and protruding portion 524e. With this wall serving as a barrier, intrusion and adhesion of conductive foreign matters can be restrained between power bus bar 522 and ground bus bar 524. Accordingly, more preferable insulating properties can be secured between bus bars 522 and 524.

Incidentally, engaging holes 554a and 554b and insulating hole 556 may be joined at corner portions thereof, so as to form one engaging hole 554.

Simply by extending the distance between two engaging holes 554a and 554b as in this example, the effect to restrain short-circuiting between protruding portions 522e and 524e with a conductive foreign matter can be increased. Therefore, the distance between engaging holes 554a and 554b may be set at a predetermined value or greater, and the formation of a resin wall with insulating hole 556 may be skipped.

In the example shown in FIG. 14C, protruding portion 524e and protruding portion 522e are provided in the same positions with respect to the longitudinal direction of respective flat plate-like portions of power bus bar 522 and ground bus bar 524. In this case, protruding portion 522e and protruding portion 524e face each other in the thickness direction of the flat plate-like portions.

In this example, engaging hole 554 is formed with engaging hole 554a with which protruding portion 522e is engaged, and engaging hole 554b with which protruding portion 524e is engaged, as in FIG. 14B. If engaging hole 554a and engaging hole 554b are joined to form a single rectangular engaging hole 554, the effect to restrain protruding portions 522e and 524e from approaching each other at the time of resin molding cannot be achieved. Therefore, engaging hole 554 is formed to be divided into the two holes: engaging hole 554a and engaging hole 554b.

Also, insulating hole 556 is formed at a location between engaging holes 554a and 554b. With this arrangement, the resin filling insulating hole 556 turns into a wall that stands between protruding portion 522e and protruding portion 524e after a hardening process, as in FIG. 14B. Accordingly, intrusion and adhesion of conductive foreign matters can be restrained between engaging hole 554a and engaging hole 554b. Thus, preferable insulating properties can be secured between power bus bar 522 and ground bus bar 524.

Particularly, where protruding portions 522e and 524e face each other and the distance between protruding portions 522e and 524e is short as in this example, the formation of a resin wall increases the effect to restrain intrusion and adhesion of conductive foreign matters.

In the example shown in FIG. 14C, protruding portion 522e and protruding portion 524e are placed to face each other as described above, so that the similarity in shape between the flat plate-like portions of power bus bar 522 and ground bus bar 524 can be increased. Accordingly, the effect to reduce the wiring inductances of power bus bar 522 and ground bus bar 524, and the effect to restrain generation of ripple current can be further increased.

Protruding portions 522e and 524e may be provided only on power bus bar 522 or on ground bus bar 524.

Protruding portions 522e and 524e are provided on sub flat-face portions 522b and 524b on the opposite side from sub flat-face portions 522b and 524b on which electric connection terminals such as positive-side connection terminals 522g and negative-side connection terminals 524g connected to capacitors 362 as well as power connection terminal 522f and ground connection terminal 524f are provided. Accordingly, protruding portions 522e and 524e can be arranged while the influence of the respective electric connection terminals on the layout is reduced.

Furthermore, sufficiently long distances can be secured between each of the electric connection terminals and protruding portions 522e and 524e. Accordingly, short-circuiting due to adhesion of a conductive foreign matter can also be restrained between each of the electric connection terminals and protruding portions 522e and 524e.

This embodiment can be realized at lower costs than a structure in which protruding portions 522e and 524e are not provided, a resin plate that insulates power bus bar 522 and ground bus bar 524 from each other is inserted beforehand between power bus bar 522 and ground bus bar 524, and resin molding is performed in metal molds. Alternatively, protruding portions 522e and 524e may be provided on power bus bar 522 and ground bus bar 524, while the resin plate is used. With this arrangement, the effect to restrain deformation of power bus bar 522 and ground bus bar 524 due to resin injection pressure can be further increased.

The entire contents of Japanese Patent Application No. 2009-293797 filed on Dec. 25, 2009, a priority of which is claimed, are incorporated herein by reference.

While only selected embodiments have been chosen to illustrate and describe the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined by the appended claims and their equivalents.

What is claimed is:

1. An actuator control device, comprising:
   a circuit device that is resin-molded by a plurality of metal molds including at least one movable metal mold to include a first bus bar and a second bus bar,
   the first bus bar and the second bus bar each including a flat plate-like portion that includes two main flat-face portions with large surface areas, and two sub flat-face portions that are adjacent to the main flat-face portions and have smaller surface areas than the main flat-face portions,
   one of the main flat-face portions of the first bus bar and one of the main flat-face portions of the second bus bar being arranged to face each other in a direction that is substantially perpendicular to a mold release direction of the movable metal mold, and the first bus bar and the second bus bar including, in a portion in which the main flat-face portions face each other, electric connection terminals connected to one side of the sub flat-face portions adjacent to the main flat-face portions, the electric connection terminals being engaged with a predetermined metal mold at the time of resin molding, and protruding portions provided at the opposite side of the electric connection terminals in the sub flat-face portions adjacent to the main flat-face portions, the protruding portions being engaged with a mold which is different from the predetermined mold at the time of resin molding.

2. The device according to claim 1, wherein the first bus bar further includes a first connecting portion that is provided at a portion at which the main flat-face portions face each other, and is connected to a positive-side terminal of a capacitor, the first bus bar being connected to a positive side of a DC power supply, and the second bus bar further includes a second connecting portion that is provided at a portion at which the main flat-face portions face each other, and is connected to a negative-side terminal of the capacitor, the second bus bar being connected to a negative side of the DC power supply.

3. The device according to claim 1, wherein the circuit device is resin-molded by the metal molds including a fixed metal mold and the movable metal mold while the first bus bar and the second bus bar are sealed with resin, and the protruding portions are engaged with an engaging groove of the movable metal mold.

4. The device according to claim 1, wherein the circuit device is resin-molded by the metal molds including a fixed metal mold and the movable metal mold while the first bus bar and the second bus bar are sealed with resin, with a resin plate being interposed between facing portions of the main flat-face portions.

5. The device according to claim 1, wherein at least one of the first bus bar and the second bus bar further includes an extension portion that is formed to extend from at least one of two end portions at a lengthwise end of the flat plate-like portion and to be bent.

6. The device according to claim 1, wherein the facing direction is parallel to an upper face or a lower face of the circuit device, or is horizontal.

7. A method of manufacturing a circuit device in an actuator control device, comprising the steps of:

forming a first bus bar and a second bus bar each including a flat plate-like portion that includes two main flat-face portions with large surface areas, and two sub flat-face portions that are adjacent to the main flat-face portions and have smaller surface areas than the main flat-face portions, supporting the first bus bar and the second bus bar with a plurality of metal molds by supporting electric connection terminals connected to one side of the sub flat-face portions adjacent to the main flat-face portions and protruding portions provided at the opposite side of the electric connection terminals in the sub flat-face portions adjacent to the main flat-face portions, in a portion in which the main flat-face portions face each other, with one of the main flat-face portions of the first bus bar and one of the main flat-face portions of the second bus bar being arranged to face each other in a direction that is substantially perpendicular to a mold release direction of at least one movable metal mold of the metal molds; and resin-molding the circuit device with the use of the metal molds so that the circuit device includes the first bus bar and the second bus bar.

* * * * *